Dec. 6, 1960   E. MacCALLUM   2,963,133
CLIP
Filed Aug. 18, 1958   4 Sheets-Sheet 1
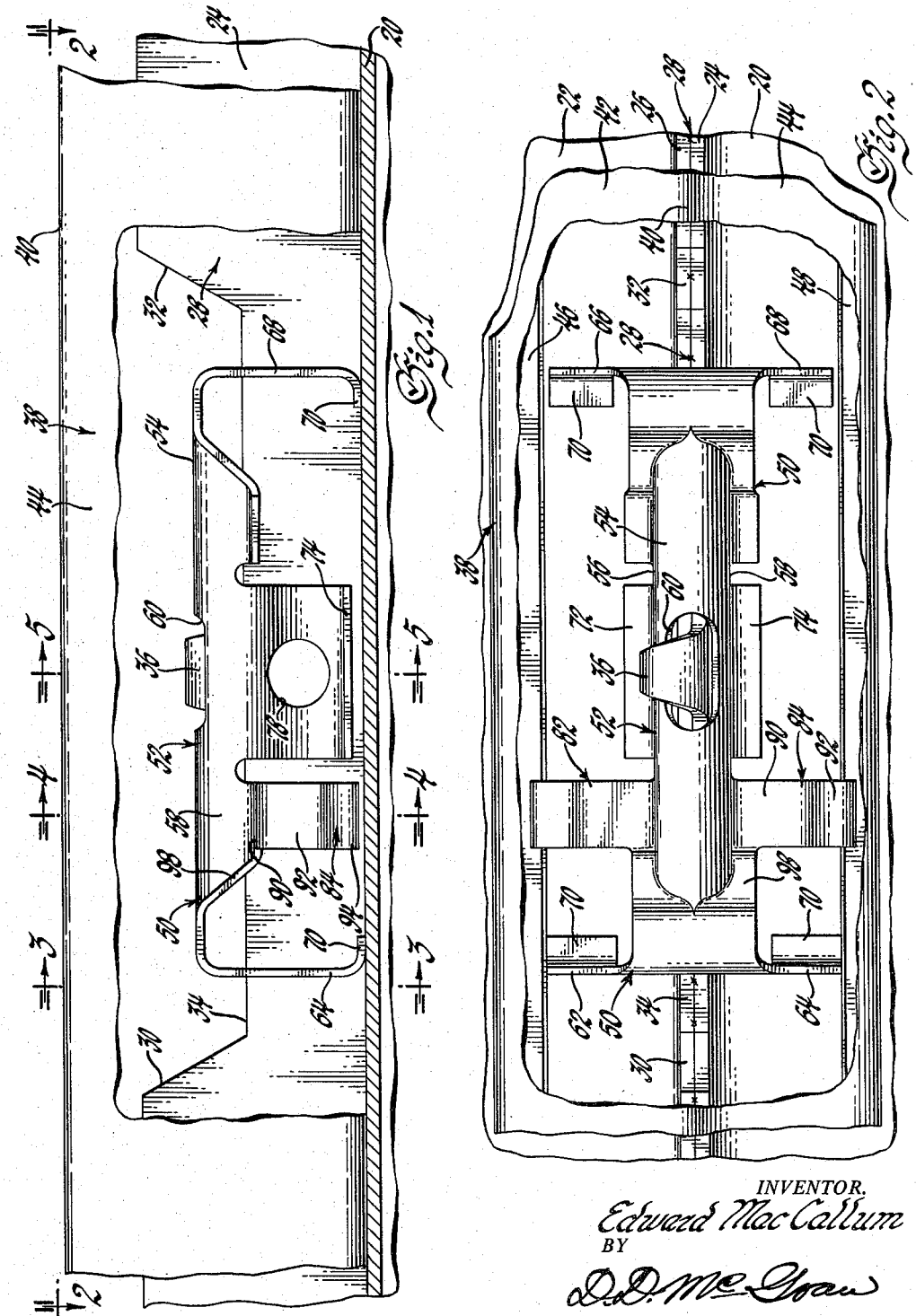
INVENTOR.
Edward MacCallum
BY
D.D. McGraw
ATTORNEY Dec. 6, 1960  E. MacCALLUM  2,963,133
CLIP
Filed Aug. 18, 1958  4 Sheets-Sheet 2

INVENTOR.
Edward MacCallum
BY
D.W. McGraw
ATTORNEY

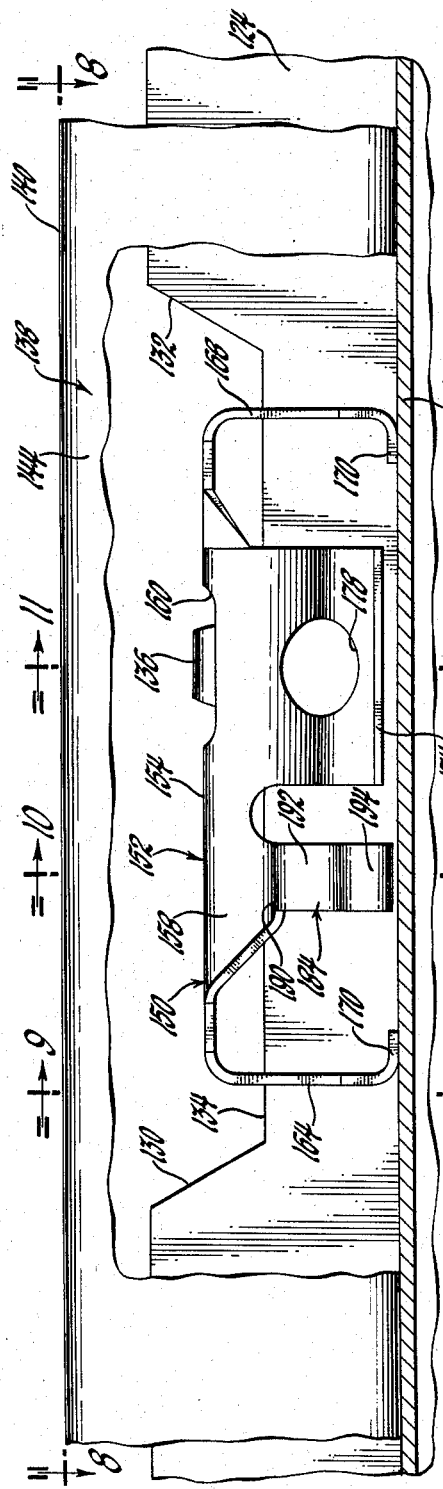

Dec. 6, 1960 E. MacCALLUM 2,963,133
CLIP
Filed Aug. 18, 1958 4 Sheets-Sheet 4

INVENTOR.
Edward MacCallum
BY
D.D. McGraw
ATTORNEY

United States Patent Office 2,963,133
Patented Dec. 6, 1960

2,963,133
CLIP

Edward MacCallum, Grosse Pointe Woods, Mich., assignor to General Motors Corporation, Detroit, Mich., a corporation of Delaware Filed Aug. 18, 1958, Ser. No. 755,589

3 Claims. (Cl. 189—88)

The invention relates to a clip for holding molding strips in place and more particularly to a clip which is secured to a pinchweld joint over which the molding strip is to be secured. It has been common practice in the past to provide molding retaining clips which engage the inwardly turned flanges provided on either side of a molding strip to hold the strip in place along one side of a panel. In many instances it is desirable to join two or more panels together at a common joint by flanges which extend out of the planes of the panels and are substantially parallel so that they may be spot welded or otherwise secured together. A joint formed in this manner is commonly known as a pinchweld. When panels are secured together by pinchweld joints in the assembly of articles of manufacture, such as household appliances and automotive vehicles, the pinchweld may extend from the outer panel surfaces and present an unattractive exterior should the joint be left uncovered. It is therefore desirable to cover the pinchweld with a molding strip of suitable formation which will be decorative as well as serve to protect the pinchweld and the clips holding the molding in place.

It has been found desirable to employ a clip which may be positively secured to the pinchweld and will be retained entirely within the confines of the molding strip. In many applications, the panels from which the pinchweld is formed may be shaped in relation to each other so that it is extremely difficult to seal the joint from the interior of the compartment or compartments defined by the panels. In such applications, it is undesirable to resort to the use of clips requiring attaching holes extending through the panels. Clips embodying the invention require no such holes and therefore eliminate the necessity for a separate sealing operation which may be difficult to accomplish.

Clips using the invention may be initially secured to the pinchweld by one or more barbs which may be provided as integral parts of the clips. The clips may then be permanently secured to the pinchweld by suitable means such as a bent tab which may be formed from a portion of the pinchweld and passed through the clip before being bent. If the clips are properly proportioned to the pinchweld on which they are to be used, they may be provided with spring retention characteristics which eliminate the necessity for the use of pinchweld-engaging barbs.

The tabs which are utilized to secure the clip permanently in place may at times be in either an unavailable position or broken. It is therefore preferable to also provide for additional securing means for holding the clip positively in place. Clips embodying the invention may include provision for the employment of such fastening means.

The clips are also self-aligning and the portions engaging the pinch-weld are independently adjustable relative to the portions engaging the molding strip. This independent adjustment feature permits use of the clip in a wider range of applications without undue consideration being given to the dimensional relations of the pinchweld and the molding strip.

In the drawings:

Figure 1 is an elevation view of a pinchweld and molding strip assembly using a clip embodying the invention and having parts broken away and in section.

Figure 2 is a view of the assembly taken in the direction of arrows 2—2 of Figure 1 and having parts broken away and in section.

Figure 7 is an elevation view of a pinchweld and molding strip assembly employing a modified clip embodying the invention.

Figure 8 is a view of the assembly taken in the direction of arrows 8—8 of Figure 7 and having parts broken away and in section.

Figure 3:
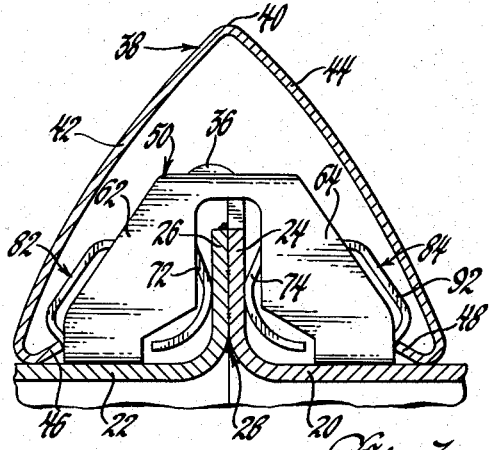
Figure 3 is a cross section view of the assembly taken in the direction of arrows 3—3 of Figure 1 and having parts broken away and in section.
Figure 4:
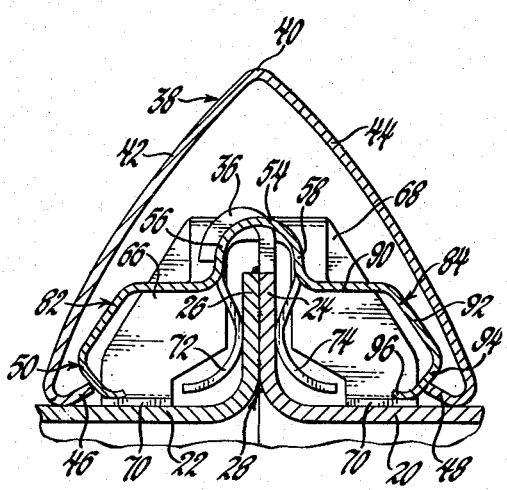
Figure 4 is a view of the assembly taken in the direction of arrows 4—4 of Figure 1 and having parts broken away and in section.
Figure 5:
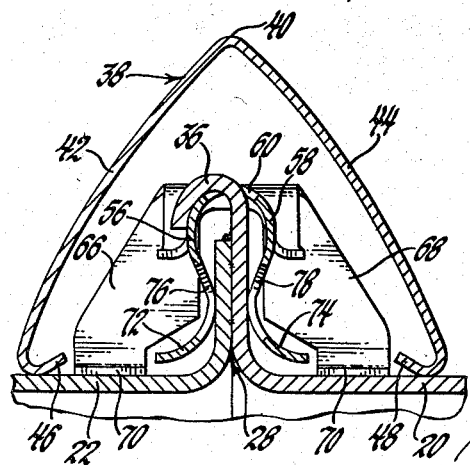
Figure 5 is a view of the assembly taken in the direction of arrows 5—5 of Figure 1 and having parts broken away and in section.
Figure 6:
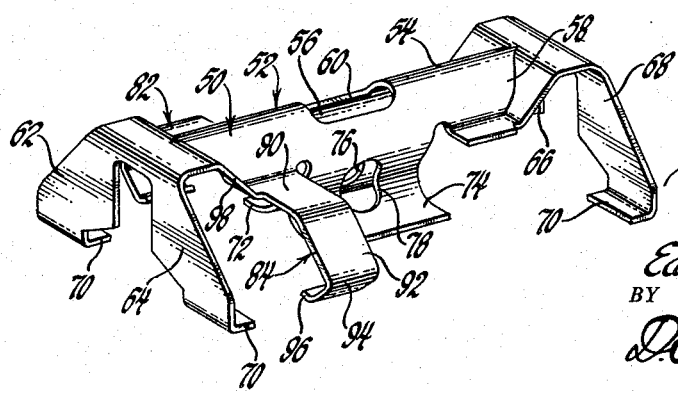
Figure 6 is an isometric view of the clip shown in the assembly of Figure 1.

The assembly shown in Figures 1 through 6 includes panels 20 and 22 which are provided with vertical flanges 24 and 26. In the process of assembly, these flanges are positioned adjacent each other and joined together by any suitable means such as spot welding to provide a pinchweld 28. The flanges 24 and 26 are undercut as indicated at 30 and 32 at spaced intervals along the pinchweld to provide a notch 34. One of the flanges, in this instance flange 24, is provided with an upwardly extending tab 36 formed in the central portion of the notch. This is best illustrated in Figures 1 through 5. The tab 36 is originally formed to extend vertically upward and is bent over as shown in the drawings after the clip to be described is installed in place.

A molding strip 38 may be placed over the pinchweld in order to protect the pinchweld as well as to make the article of manufacture, of which the panels 20 and 22 are a part, more attractive. The strip illustrated in the drawings is generally triangular in cross section and has its apex 40 positioned substantially in the plane of the pinchweld 28. The sides 42 and 44 of the strip extend downwardly and outwardly from the apex 40 and terminate in inwardly turned flanges 46 and 48, respectively, which preferably extend in slightly upward directions so that the strip 38 engages the panels 20 and 22 at curved sections.

The clip 50 is arranged so that it receives pinchweld 28 intermediate its sides and has portions engaging the flanges 46 and 48 of the molding strip 38 to hold that strip in place. Clip 50 is preferably formed with a body 52 which extends longitudinally of the clip. Body 52 may have a generally channel-shaped cross section and is illustrated in this instance as having a curved channel-like cross section defined by a center section or arched portion 54 and side sections 56 and 58. These sections are integrally formed to define the generally semi-tubular or channel section of body 52.

The body center section 54 is undercut to provide an aperture 60 which receives tab 36 therein when the clip is placed over the pinchweld 28. Aperture 60 may extend slightly into the side sections 56 and 58, if necessary, in order to permit proper installation of the clip.

Each end of the clip is provided with terminal legs which support the clip relative to the channels 20 and 22. Legs 62 and 64 are provided at one end and legs 66 and 68 are provided at the other end. The legs forming each pair are preferably coplanar and spaced from each other so that a generally horseshoe-shaped end is provided when the clip is viewed from either end. The legs may extend downwardly and outwardly from the upper ends or may be generally parallel with each other. In either case, they are integrally formed with the clip body 52. The plane of each pair of legs is substantially vertical and transverse to a vertical longitudinal plane passing through the clip body. Each of the terminal legs may have a tab 70 formed on the outer end thereof which extends in a plane generally parallel to the longitudinal axis of the body 52. Tabs 50 may extend either inwardly toward the center of the clip or may extend outwardly as desired.

A pair of flanges 72 and 74 may be integrally formed with the clip body sides 56 and 58 and extend downwardly and inwardly toward the vertically disposed longitudinal center plane of the clip body and then be bent or curved to extend downwardly and outwardly from that plane. These flanges may be located centrally of the clip as shown, or may be positioned adjacent terminal legs 66 and 68 as desired. Apertures 76 and 78 are respectively provided in flanges 72 and 74 and are substantially in alignment so that any suitable securing means, such as a bolt, screw, or pin, may be passed therethrough. Thus, if the pinchweld tab 36 is broken off or otherwise unusable, a hole may be drilled through pinchweld 28 in alignment with apertures 76 and 78 and a suitable fastener may be passed through the hole and the apertures to secure the clip in place on the pinchweld. This feature is particularly useful when the molding strip 38 is being replaced in service since the tab 36 is likely to be broken during removal of the old molding strip and any clips requiring replacement. Flanges 72 and 74 may be provided with barbs struck from the portions engaging the pinchweld 28 if desired. Such barbs would permit the clip to be easily snapped onto the pinchweld, but would prevent easy removal of the clip unless the flanges 72 and 74 are first spread apart. These flanges preferably have sufficient spring tension to hold the clip in place without such barbs under most conditions and are so illustrated in the drawings.

The clip body 52 is also provided with a pair of flanges 82 and 84 which are positioned between the terminal legs 62, 64 and the flanges 72, 74. Since each of the flanges are similar, only flange 84 will be described in detail. Flange 84 is integrally formed from the body side 58 and extends outwardly and downwardly and then inwardly and downwardly a distance slightly less than that of the terminal legs in a vertical direction and slightly greater than that of the terminal legs in a horizontal direction. As illustrated in the drawings, a flange 84 is bent outwardly adjacent side 58 to provide a generally horizontal section 90 which extends laterally of the clip. The next section 92 of the flange extends downwardly and slightly outwardly and the lower section 94 extends downwardly and inwardly from section 92, terminating in a slightly curved end 96. The section 90 of the flange may have a root portion connecting with the fillet 98 which also forms a part of the root portion of the terminal legs. This provides an axis about which flange 84 may be springingly moved in a vertical plane. The axis so provided is positioned away from the clip body section in order to allow movement of the flange 84 without affecting the position of flange 74.

When molding strip 38 is installed over the clip, the molding flange 48 will engage the outer surface of flange section 94 and be held tightly against panel 20 by the combined spring actions of the flange 84 and the molding side 44. The horizontal distance between the points of engagement of the molding strip flanges 46 and 48 with the clip flanges 82 and 84 is sufficiently greater than the distance between the inner edges of the molding flanges to provide the requisite spring tension effect in each of the clip flanges engaged by the molding.

Assembly of the unit is normally accomplished by pushing the clip 50 downwardly over the pinchweld 28 so that a tab 36 extends through the clip aperture 60. The tab is then bent over the clip body 52 as shown in the drawings to hold the clip in place. After the desired number of clips are installed on the pinchweld, the molding strip 28 is snapped in place over the flanges 82 and 84 and the assembly is completed. The strip is then tightly anchored in place and completely covers the pinchweld as well as the clip to present a more attractive appearance and protect the pinchweld from the elements and other external hazards.

When it is desired for any reason to replace a molding strip, the original strip may be snapped off the clips. The tab 36 may be easily straightened to permit removal of any old clips needing replacement. Since the tab may be accidentally broken off during this operation, the clips are also provided with means permitting them to be secured to the pinchweld by separate fasteners.

Figure 9:
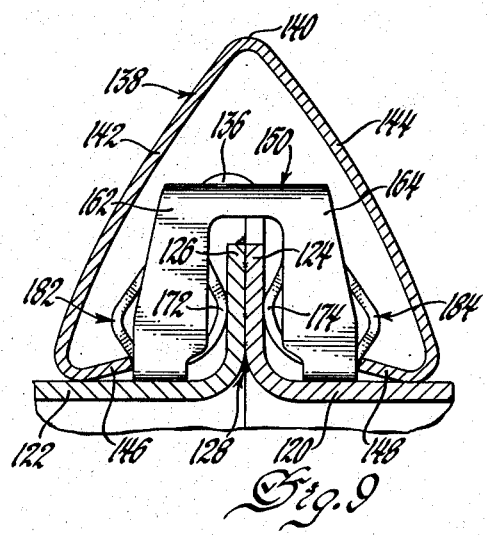
Figure 9 is a view of the assembly taken in the direction of arrows 9—9 of Figure 7 and having parts broken away and in section.
Figure 10:
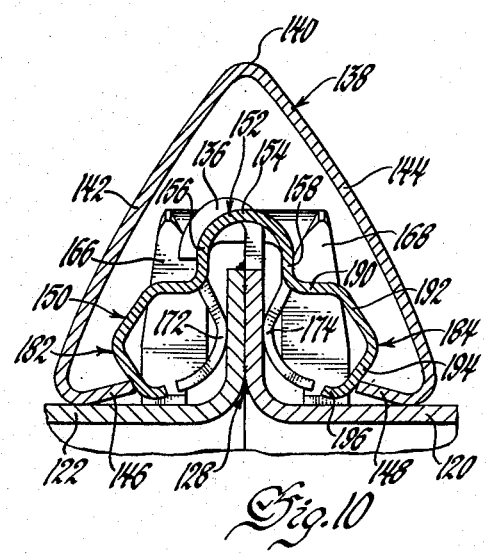
Figure 10 is a view of the assembly taken in the direction of arrows 10—10 of Figure 7 and having parts broken away and in section.
Figure 11:
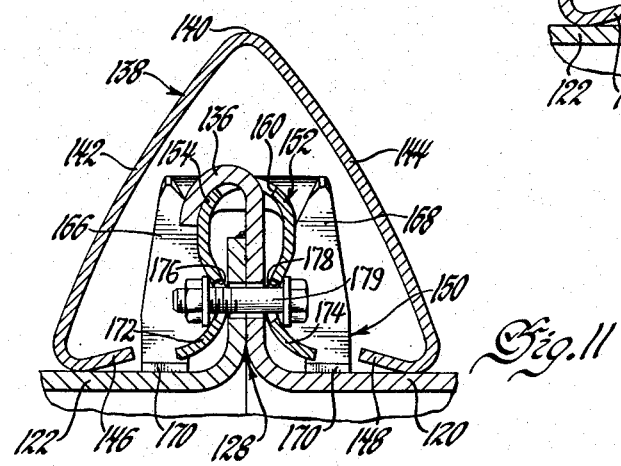
Figure 11 is a view of the assembly taken in the direction of arrows 11—11 of Figure 7 and having parts broken away and in section.
Figure 12:
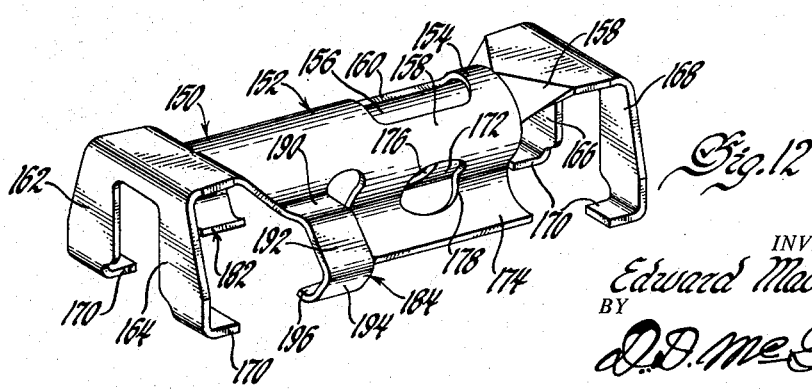
Figure 12 is an isometric view of the modified clip shown in Figure 7.

Figures 7 through 12 show a modified clip embodying the invention. The panels 120 and 122 are joined together by means of vertical flanges 124 and 126 to form the pinchweld 128. The panel flanges are undercut at spaced intervals as indicated at 130 and 132 to provide notch 134. Flange 124 may be provided with an upwardly extending tab 136 formed in the center portion of the notch. The tab may be provided on either flange 124 or flange 126 if desired. The molding strip 138 is illustrated as being generally triangular in cross section with its apex 140 being positioned substantially in the plane of the pinchweld 128 when the molding is installed. The molding sides 142 and 144 extend downwardly and outwardly from the apex 140 and terminate in inwardly and upwardly turned flanges 146 and 148, respectively, thereby engaging the panels 120 and 122 at curved sections rather than at sharp edges.

The clip 150 is placed over the pinchweld 128 so that it receives the pinchweld in a vertical plane extending centrally and longitudinally of the clip. Portions of the clip engage the panel flanges 124 and 126 to position the clip on the pinchweld while other portions engage the molding flanges 146 and 148 to hold the molding strip in position.

The clip 150 includes a clip body 152 extending longitudinally and formed in a generally inverted channel cross section. The channel formation may be angular or curved and is shown in this instance as being curved to provide a substantially semi-tubular center arched section 154 and side sections 156 and 158. The body center section 154 is undercut so that the aperture 160 is formed. This aperture receives pinchweld tab 136 when the clip is placed over the pinchweld 128.

The clip is provided with terminal legs which support and space it relative to the panels 120 and 122. Terminal legs 162 and 164 form one pair of legs at one end of the body 152 and legs 166 and 168 form another pair of terminal legs at the other end of the body. Each pair of legs is preferably coplanar and each leg of each pair is spaced from the other leg of each pair to present a horseshoe appearance when the clip is viewed from either end. The legs are integrally formed with the clip body and are bent at their junctions with that body so that the planes in which they are positioned are generally vertical and transverse to the vertical and longitudinal center plane of the clip body which is also occupied by the pinchweld.

The terminal legs are illustrated as having horizontal ends 170 which may be formed as bent-over tabs or may be formed by the edge ends of the legs. If tabs are provided, they may be similar to tabs 70 of the clip earlier described.

The clip 150 has a pair of pinchweld mounting flanges 172 and 174 which are integrally formed with the clip body sides 156 and 158 and extend downwardly and inwardly toward the vertically disposed longitudinal center plane of the clip. The flanges are then bent or curved to extend downwardly and outwardly from that plane. Apertures 176 and 178 are respectively provided in flanges 172 and 174 and are substantially aligned so that any suitable clip securing means 179 may be passed therethrough if necessary. Securing means 179 may be used concurrently with tab 156 to provide sufficient securing force if the tab is not considered adequate.

The clip is also provided with a pair of molding strip retaining flanges 182 and 184. These flanges are integrally formed with the clip body 152 and are positioned intermediate mounting flanges 172, 174 and terminal legs 162, 164. The retaining flanges of the modified clip are positioned to one side of the transverse center of the clip body while the mounting flanges are positioned substantially on the other transverse side of the clip body.

Since the retaining flanges are similar, only flange 184 will be described in detail. This flange is provided with an outwardly and downwardly extending portion including the generally horizontal section 190 which provides the root portion of the flange. The next flange section 192 extends downwardly and outwardly from section 190. Flange section 194 extends downwardly and inwardly from section 192 and provides the molding flange engaging surface which engages molding flange 148. The flange end 196 is bent upwardly and inwardly from section 194 and extends to a point slightly above the lower ends of the terminal legs.

The modified clip is assembled and used in a manner identical to the clip first described. It provides a somewhat shorter clip which is often desirable in installations having room only for a minimum clip length. It also permits more angular flexibility in location of the molding strip than does the clip of Figures 1 through 6. It may also be attached by bending the tab 136 over the clip body 152, or by using independent securing means as earlier described.

What is claimed is:

1. In a clip for holding a flanged molding strip to a pinchweld, a body having a center section and two side sections integrally formed therewith and extending downwardly therefrom to provide an inverted channel-like cross-section, said body center section having an aperture formed therethrough for receiving a clip-holding tab formed on the pinchweld, a pair of generally parallel and coplanar clip-positioning terminal legs integrally formed on each end of said body and downwardly bent to extend transversely thereto and downwardly beyond said body side sections, a pair of clip mounting flanges integrally formed with and positioned adjacent one end of said body and extending first downwardly and inwardly toward the vertically disposed longitudinal center plane of said body and then extending downwardly and outwardly therefrom and having aligned apertures formed therethrough for receiving clip anchor means, and a pair of molding strip retaining flanges integrally formed with said clip body intermediate said clip mounting flanges and one of said pairs of terminal legs and adjacent the other end of said clip body from said clip mounting flanges, each of said retaining flanges extending first outwardly and downwardly and then inwardly and downwardly relative to said body for springingly engaging and holding the flanged molding strip to the pinchweld.

2. In combination in a pinchweld molding securing assembly, at least two panels having flanges joined to form a pinchweld, an upwardly extending tab integrally formed from one of said flanges, a molding having an arched cross section and inwardly turned flanges formed adjacent either edge, and a clip securing said molding to said pinchweld whereby said clip and said pinchweld are covered by said molding in the assembled position, said clip comprising a body having an aperture formed therein and receiving said tab, legs on either end of said body and supporting said clip on said panels on both sides of said pinchweld, mounting flanges extending downwardly from and adjacent one end of said body and receiving said pinchweld therebetween and retaining said clip on said pinchweld, and molding engaging flanges extending first downwardly and outwardly and then downwardly and inwardly in relation to said body and integrally formed therewith adjacent the other body end and springingly engaging said molding flanges whereby said molding is held in position over said pinchweld and on said panels, said tab being bent over said body to retain said clip to said pinchweld.

3. The assembly of claim 2, said mounting flanges having aligned fastener receiving apertures formed therethrough.

References Cited in the file of this patent

UNITED STATES PATENTS

| | | |
|---|---|---|
| 1,451,043 | Le Compte | Apr. 10, 1923 |
| 2,318,840 | Del Camp | May 11, 1943 |
| 2,350,315 | Kral | May 30, 1944 |
| 2,539,956 | Klingensmith | Jan. 30, 1951 |
| 2,746,111 | Chvosta | May 22, 1956 |
| 2,837,184 | Fernberg | June 3, 1958 |